June 18, 1929.                L. F. CARTER                1,717,837
                    SAFETY BEARING FOR GYROCOMPASSES
                  Filed March 27, 1925         2 Sheets-Sheet 1
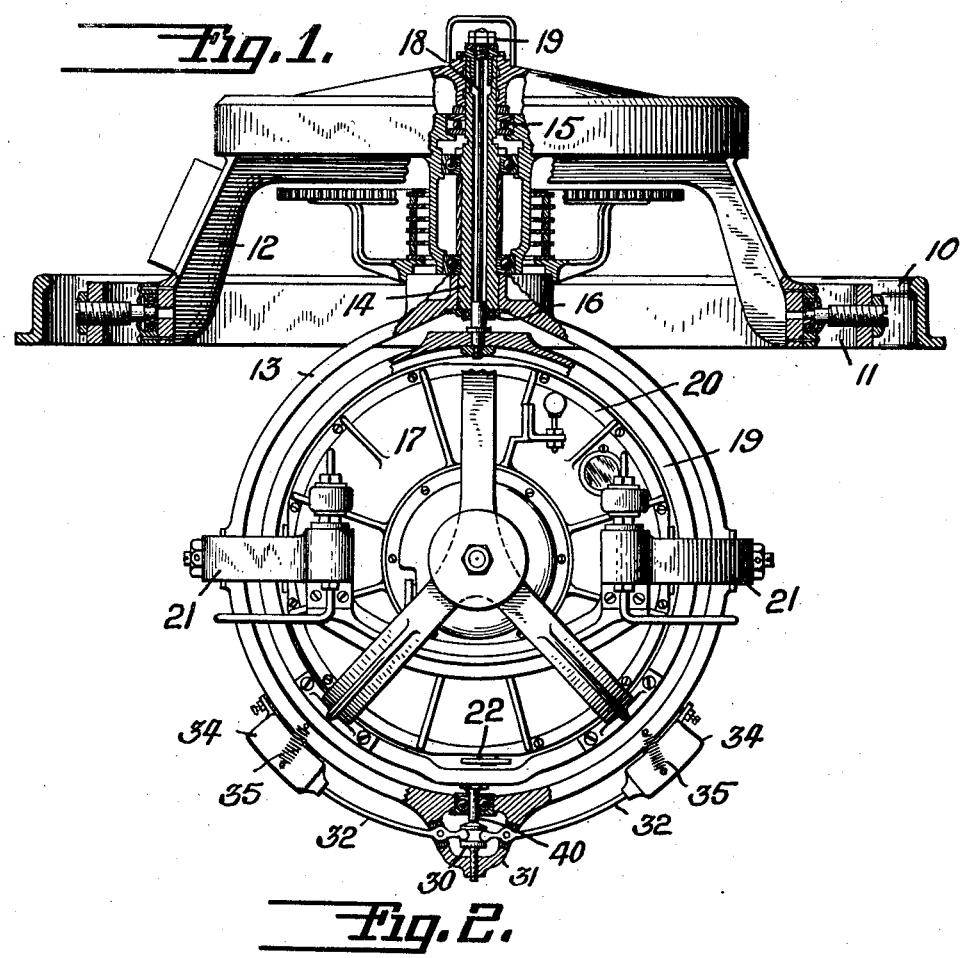

June 18, 1929.  L. F. CARTER  1,717,837
SAFETY BEARING FOR GYROCOMPASSES
Filed March 27, 1925  2 Sheets-Sheet 2
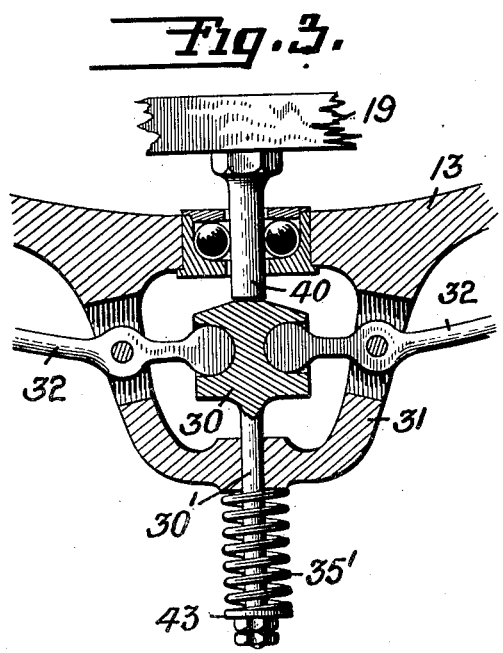
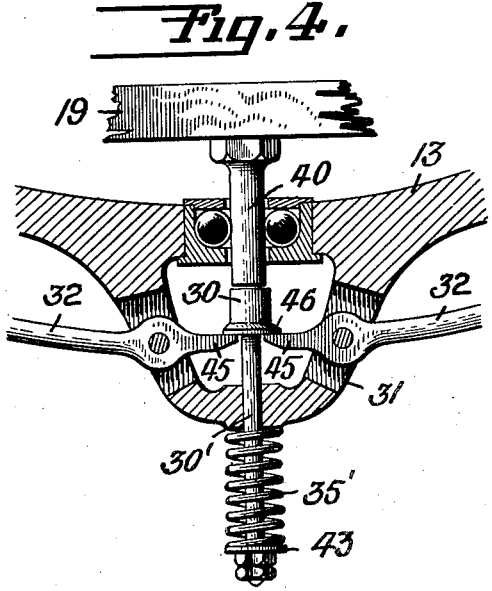
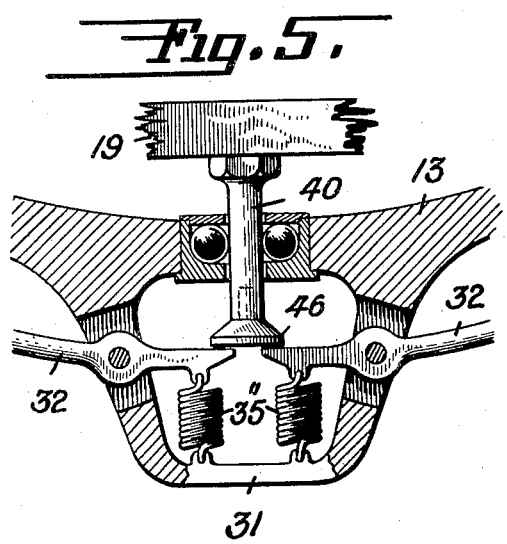
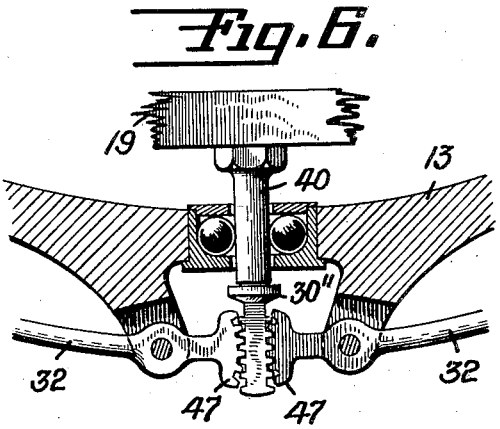
Inventor
LESLIE F. CARTER.
By his Attorney
Herbert H. Thompson Patented June 18, 1929.

1,717,837

UNITED STATES PATENT OFFICE.

LESLIE F. CARTER, OF LEONIA, NEW JERSEY, ASSIGNOR, BY MESNE ASSIGNMENTS, TO SPERRY GYROSCOPE COMPANY, INC., A CORPORATION OF NEW YORK.

SAFETY BEARING FOR GYROCOMPASSES.

Application filed March 27, 1925. Serial No. 18,772.

This invention relates to gyroscopic compasses and more specifically to means for preventing injury to the sensitive element of said compasses. As is well known in the art, the sensitive element of the gyroscopic compass is supported by a delicate suspension and by light bearings, and any severe jar to which the compass is subjected either when moving the same about prior to installation or due to pitching or other violent movements of the ship will place a severe strain upon said bearings and said suspension, and in some cases seriously damage the delicate suspension. The principal object of my inventon, therefore, is to provide means for preventing transmission to the suspension of excess stresses and strains and for relieving the bearings of the sensitive gyroscopic element of said stresses and strains.

Other objects and advantages of my invention will become apparent in the following detailed description thereof.

In the accompanying drawings—

Fig. 1 is a front elevation, partly sectioned, and with parts broken away, of a gyroscopic compass having one form of my invention applied thereto.

Fig. 2 is an enlarged detail view, partly sectioned, of a modified form of my invention.

Figs. 3 to 6 inclusive are views similar to Fig. 2, each of said views disclosing a further modification of my invention.

Referring now to Fig. 1 of the drawings, there is shown a compass supported in the usual manner within a casing 10, by a gimbal ring 11 pivoted therein, and a spider 12 pivoted in said gimbal ring 11 at right angles to the pivotal axis of said ring 11. Said spider supports a follow-up member comprising a follow-up ring 13 formed integrally with a spindle 14, said spindle being journaled in said spider upon upper and lower ball bearings 15—16 so as to be free to rotate about a vertical axis but constrained against movement about any other axis. Said spindle 14 serves to support the sensitive element 17 of the gyroscope. As shown, the sensitive element is suspended by means of a bundle of fine wires 18 supported by some suitable means 19 at the top of the spindle 14. At the lower end of wires 18 is supported the vertical ring 19 within which is pivotally mounted about a horizontal axis the gyro casing 20 having the gyro rotor rotatably mounted therein. The mercury ballistic elements 21 are shown pivotally mounted on the follow-up ring 13 and connected to the gyro casing at 22 to impart meridian seeking properties to said gyroscope. The above structure outlines those elements of the well known Sperry gyroscopic compass which are illustrated in Fig. 1 and will be readily appreciated by those skilled in this art.

It will be apparent from the above brief description of the structure of the gyroscopic compass that the mounting of the sensitive element is extremely delicate and that sudden jars or rough handling would be likely to cause injury to the said suspension. To obviate this I provide means for relieving the said suspension of unusual stresses and strains by providing an auxiliary resilient support adapted to be called into action whenever the stresses upon the suspension exceed a predetermined limit.

One form of my invention is illustrated in Fig. 1 and comprises a member 30 mounted for vertical reciprocation in an extension 31 formed on the lower side of follow-up ring 13. The reciprocatory member 30 is normally held in a predetermined position by means of a pair of levers 32 preferably pivoted on the follow-up ring or on the extension 31 and having one end of each lever engageable in a groove formed in the member 30. The other ends of said levers 32 may be provided with weights 34 which would normally tend to rotate the levers 32 in a direction to move member 30 upwardly. The action of the weights 34 is counterbalanced, however, to any desired degree by means of resilient members, such as springs 35 attached to the follow-up ring 13, and to the levers 32 at opposite ends thereof, said springs being so adjusted that reciprocatory member 30 is normally held in a predetermined position. Said position is preferably such that the top of member 30 lies within a very short distance, such as .001" below a stem 40 formed on the vertical ring 19 and extending through the follow-up ring 13 into the extension 31.

The operation of the device will now be readily apparent. When unusual stress is placed upon the suspension through such upward or downward acceleration or deceleration forces as tend to increase the weight of said element, i. e., increase the normal pull on the suspension, extension 40 will engage member 30 to move the former upwardly against the action of springs 35. In other words, the resilient support, comprising the member 30, levers 32 and springs 35, will now take up the major portion of the stress thus relieving the bearings 15 and 16 and the suspension 18 of the unusual forces which would otherwise operate thereon and tend to damage the same.

Various modifications of my invention will readily suggest themselves and certain of said modifications are illustrated herewith in order to demonstrate that the principle is capable of many embodiments. Thus in Fig. 2 I have shown the top of member 30 as flat and having a ball 41 therein to provide a ball bearing contact between projection 40 and the reciprocatory member. The ends of levers 32, which engage said member 30, may be flat, vertical discs, if desired, operating in similar cut-out portions in the head of member 30 instead of circumferential grooves as in the Fig. 1 modification.

The modification illustrated in Fig. 3 is similar to that in Fig. 1 with the exception that the stem 30' of member 30 extends beyond the extension casing 31 and is provided with a washer 43 at the end thereof for engaging a spring 35' between the same and the casing 31. This spring may take the place of the springs 35 in Fig. 1 or may be used in addition thereto.

The modification of Fig. 4 is similar to that of Fig. 3 with the exception that the ends of levers 32 do not engage a groove or grooves at the upper ends of reciprocatory member 30 but are in the form of fingers 45 engaging beneath a projection 46 formed at the upper end of said member 30.

The modification of Fig. 5 will be recognized as an extension of that of Fig. 4. In this modification the member 30 and all parts connected therewith have been discarded and the member 40 on the vertical ring has been provided on its lower end with an extension 46 adapted to engage the inner ends of levers 32 directly. Each of said inner ends is shown provided with an individual spring 35'' connected to said inner end of lever 32 and to extension casing 31 at its opposite ends. In this modification obviously, any force tending to increase the normal pull on the sensitive element will cause the inner ends of levers 32 to engage extension 46, compressing springs 35'', and so assist in supporting said element and resist the excessive stresses and strains without permitting the sensitive element being lowered.

In the modification shown in Fig. 6, the projection 40 on the vertical ring is adapted to engage a reciprocatory member 30'', which, in this instance, is in the form of a double rack engaging gear segments 47 formed on the inner ends of the levers 32. Said levers may be maintained in a predetermined position by any means such, for example, as the springs 35 and weights 34 of Fig. 1.

Further modifications of the general principles underlying my invention will suggest themselves to those skilled in the art in the light of the above disclosure.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyroscopic compass, a sensitive element, a support therefor, a normally ineffective auxiliary support for said element, and means responsive to acceleration forces which tend to increase the weight of said support whereby said auxiliary support is rendered effective to take the increased weight off the first-named support.

2. In a gyroscopic compass, a sensitive element, a support therefor, an auxiliary support for said element normally spaced therefrom a predetermined distance and means responsive to acceleration forces having a vertical component for bringing the latter into contact with said element.

3. In a gyroscopic compass, a sensitive element, a suspension support therefor, a normally ineffective auxiliary support for said element, and means responsive to acceleration forces having a vertical component for rendering said auxiliary support effective whereby said suspension support is relieved of the extra downward pull of said element due to said forces.

4. In a gyroscopic compass, a sensitive element, a suspension support therefor, a normally ineffective thrust bearing for said element, and means responsive to acceleration forces having a vertical component for rendering said thrust bearing effective whereby said suspension support is relieved of the extra downward pull of said element due to said forces.

5. In a gyroscopic compass, a sensitive element, a follow-up member, means whereby said element is supported on said member, and an auxiliary support for said element carried by said member, said auxiliary support comprising a lever adapted to assist in supporting said element and means for opposing the movement of said lever.

6. In a gyroscopic compass, a sensitive element, a follow-up member, means whereby said element is supported on said member, and an auxiliary support for said element carried by said member, said auxiliary support comprising a lever pivoted on said member adapted to assist in supporting said element, and a spring for yieldingly opposing the movement of said lever and holding the outer end of said lever folded against said member.

7. In a gyroscopic compass, a sensitive element, a follow-up member, means whereby said element is supported on said member and an auxiliary support for said element carried by said member, said auxiliary support comprising a plurality of levers weighted at their outer ends and symmetrically pivoted to said member and with their inner ends adapted to bear on said support and yielding means for opposing the movement of said levers.

8. In a gyroscopic compass, a sensitive element, a follow-up member, means whereby said element is supported on said member, and an auxiliary support for said element carried by said member, said auxiliary support comprising a lever weighted at its outer end and pivoted on said member with its inner end adapted to bear on said element and yielding means for maintaining said lever out of contact with said element and the weighted end of said lever close to said member.

9. In a gyroscopic compass, a sensitive element, a support therefor, and an auxiliary support for said element, said auxiliary support comprising a lever weighted at its outer end and adapted to bear its inner end on said element and yielding means for opposing the movement of said lever and for maintaining said lever spaced a predetermined distance from said element whereby vertical acceleration forces cause said weighted lever to come in contact with said element and assist in supporting the same.

10. In a gyroscopic compass, a sensitive element, a suspension support therefor, a thrust bearing for said support, a normally ineffective auxiliary support for said element, and means responsive to acceleration forces having a vertical component for rendering said auxiliary support effective whereby said suspension support is relieved of the extra downward pull of said element due to said forces.

11. In a gyroscopic compass, a sensitive element, a suspension support therefor, a thrust bearing for said support, a normally ineffective auxiliary thrust bearing for said element, and means responsive to acceleration forces having a vertical component for rendering said auxiliary thrust bearings effective whereby said suspension support is relieved of the extra downward pull of said element due to said forces.

In testimony whereof I have affixed my signature.

LESLIE F. CARTER.